United States Patent [19]

Ohsawa et al.

[11] 4,194,396
[45] Mar. 25, 1980

[54] AUTOMOBILE FUEL GAUGE SYSTEM

[75] Inventors: Eiji Ohsawa, Ebina; Yoshiro Yoshikawa, Hiratsuka, both of Japan

[73] Assignee: Nissan Shatai Co., Ltd., Japan

[21] Appl. No.: 919,447

[22] Filed: Jun. 27, 1978

[30] Foreign Application Priority Data

Jul. 7, 1977 [JP] Japan .................... 52-89145[U]

[51] Int. Cl.$^2$ .................. G01F 23/06; G01F 23/10
[52] U.S. Cl. ........................ 73/311; 73/313; 116/118 R; 116/229
[58] Field of Search .............. 73/305, 306, 307, 309, 73/311, 317, 318, 321; 137/574, 582, 590; 220/1 B, 1 V, 85 R, 85 B; 116/118 R

[56] References Cited

U.S. PATENT DOCUMENTS

| | | | |
|---|---|---|---|
| 2,448,783 | 9/1948 | De Giers et al. | 73/313 X |
| 2,516,452 | 7/1950 | Giers et al. | 73/311 |
| 2,814,337 | 11/1957 | Foster | 137/574 |
| 3,168,904 | 2/1965 | Conover | 73/311 UX |
| 3,173,469 | 3/1965 | Shockey | 137/582 X |
| 3,731,805 | 5/1973 | Schniers | 73/311 X |
| 3,942,379 | 3/1976 | Kanzler | 73/311 |
| 4,092,861 | 6/1978 | Fling | 73/311 |

FOREIGN PATENT DOCUMENTS

| | | | |
|---|---|---|---|
| 2284106 | 4/1976 | France | 116/118 R |
| 482802 | 4/1938 | United Kingdom | 73/317 |

*Primary Examiner*—Donald Watkins
*Attorney, Agent, or Firm*—McGlew and Tuttle

[57] ABSTRACT

An automobile fuel gauge system comprises a main sensor unit for a main indicating system being provided in a fuel tank, a small chamber with top open fixedly provided at the bottom of the fuel tank and having at its lower side a hole for fuel passage, and an auxiliary sensor unit for an auxiliary indicating system provided in said chamber. The system includes a main dial section and an auxiliary dial section for performing indications according to electric signals transmitted from said main and auxiliary sensor units, respectively, and said auxiliary sensor unit is adapted to operate only when fuel in the fuel tank is running short.

3 Claims, 6 Drawing Figures

AUTOMOBILE FUEL GAUGE SYSTEM

FIELD AND BACKGROUND OF THE INVENTION

The present invention relates in general to an improved fuel gauge system, and in particular to a fuel gauge system for use in automobiles whereby it is enabled to measure and indicate more accurately the quantity of fuel remaining in a fuel tank especially when the fuel is running short.

DESCRIPTION OF THE PRIOR ART

A conventional fuel gauge system for use in general automobiles is usually designed so that the change in the resistance of sensor unit may be indicated by a single indicating pointer through a single sensor unit provided at the side of a fuel tank as shown in FIG. 1.

The conventional fuel gauge system of the above-mentioned type is disadvantageous in that it is difficult during the process of production to adjust errors in the system with a sensor unit and an indicator unit as one set; thus the overall accuracy of the system is determined by the sum of errors in both the sensor unit and the indicator unit and therefore it widely varies. In addition, the accuracy of the absolute values of fuel level readings on the system is deteriorated as the capacity of the fuel tank increases; for instance, if the limit of errors appearing in the indications of the pointer is assumed to be 1/10 of the full scale when the pointer indicates ¼ of the full scale, the error will be 3 liters when the tank capacity is 30 liters, and it will be as large as 9 liters when the tank capacity is 90 liters (see FIG. 2).

SUMMARY OF THE INVENTION

It is an object of the present invention to provide a fuel gauge system which, in order to improve the accuracy thereof, has two kinds of indicating systems designed to correctly measure and indicate the quantity of fuel remaining in the fuel tank especially when the fuel is running short. In other words, it is an object of the present invention to provide a fuel gauge system which can indicate, more correctly than the conventional fuel gauge system, the distance or mileage that can be travelled by an automobile with fuel running short.

According to the present invention, there is provided an automobile fuel gauge system comprising a main sensor unit for a main indicating system being provided in a fuel tank, an auxiliary small chamber fixedly provided at the bottom of the fuel tank and having at its lower side a hole for fuel passage, an auxiliary sensor unit for an auxiliary indicating system being provided in said chamber, and a main dial section and an auxiliary dial section for performing indications according to electric signals transmitted from said main and auxiliary sensor units respectively, said auxiliary sensor unit being adapted to operate only when fuel in the fuel tank is running short.

The system may be embodied so that a main pointer of the main dial section disappear from sight when the fuel in the fuel tank was running short, and immediately thereafter an auxiliary pointer of the auxiliary dial section may come in sight. For this purpose, there may be provided in the vicinity of an "Empty"-indicating portion on said main dial section a section for covering the main pointer, and also provided in the vicinity of an indication-starting position on the auxiliary dial section a section for covering the auxiliary pointer.

The various features of novelty which characterize the invention are pointed out with particularity in the claims annexed to and forming a part of this disclosure. For a better understanding of the invention, its operating advantages and specific objects attained by its uses, reference should be had to the accompanying drawings and descriptive matter in which there are illustrated preferred embodiments of the invention.

DESCRIPTION OF THE PREFERRED EMBODIMENTS

Figure 3:
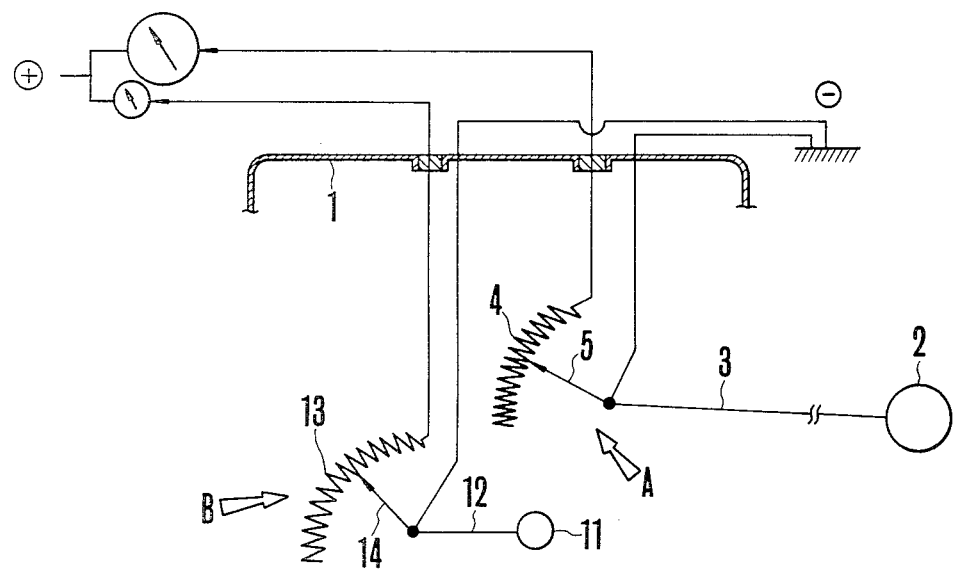
FIG. 3 shows a schematic circuit diagram of the sensor units according to the present invention.
Figure 4:
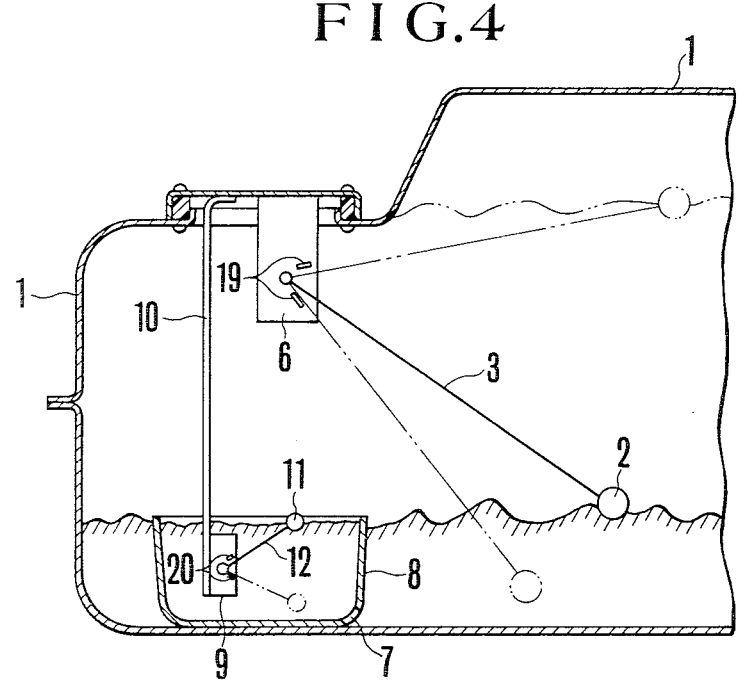
FIG. 4 is a sectional view of a fuel tank, showing sensor units according to the present invention.

As shown in FIG. 3, a main sensor unit A for a main indicating system and also an auxiliary sensor unit B for an auxiliary indicating system are provided in a fuel tank 1. The main sensor A substantially consists of, as with the conventional fuel gauge system, a float 2, a rod 3 for supporting the float 2 and of a coil 4 and a contact 5 for converting the displacement of the float 2 into an electric signal; in addition, the main sensor unit A is attached to a main gauge 6 provided in the fuel tank 1 as shown in FIG. 4. The auxiliary sensor unit B also consists of a float 11, a rod 12 for supporting the float 11 and of a coil 13 and a contact 14 for converting the displacement of the float 11 into an electric signal, as in the case of the main sensor unit A. Besides, as shown in FIG. 4, the auxiliary sensor unit B is attached to an auxiliary gauge 9 provided in an auxiliary chamber 8 with open top fixed to the bottom of the fuel tank 1 and having at its lower side at least one small hole 7 for introducing fuel in the chamber 8 from the fuel tank 1. The auxiliary gauge 9 is fixed by a bracket 10 vertically extending from the top of the fuel tank 1 to the inside of the chamber 8.

The depth or height of the chamber 8 may be chosen according to the remaining fuel level at which the auxiliary indicating system is to start operation. More particularly, if it is desired to operate the auxiliary indicating system when the fuel remaining in the tank is reduced to a level ¼ to 1/5 of the full, the height of the chamber 8 may be selected so that it corresponds to the capacity level of the tank 1, i.e. to ¼ to 1/5 thereof. In addition, the width and length (or diameter if cylindrical) of the chamber 8 should be made as small as possible so far as it can accommodate the auxiliary sensor unit B therein and permits free vertical motion of the float 11, because the error due to fuel surface vibrations during travelling decreases as the surface area of the remaining fuel in the chamber 8 decreases and thereby the accuracy of the fuel gauge system is further improved; the width and length of the chamber 8 is preferably not greater than twice the height thereof.

At the side walls of the respective gauges 6 and 9, there are provided stoppers 19 and 20, respectively, so that the displacements of the floats 2 and 11 may not exceed the predetermined range.

Figure 1:
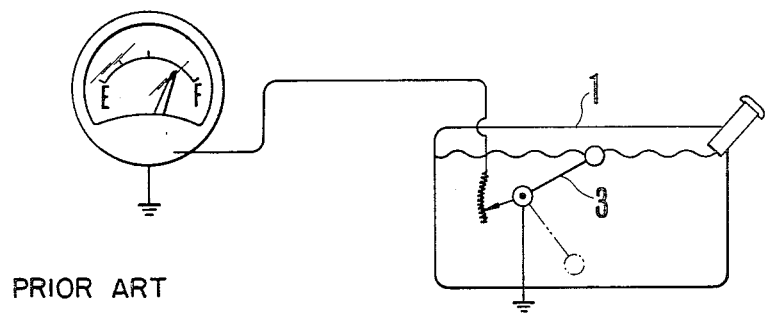
FIGS. 1 and 2 are schematic illustration showing the conventional fuel gauge system for automobiles.
Figure 2:
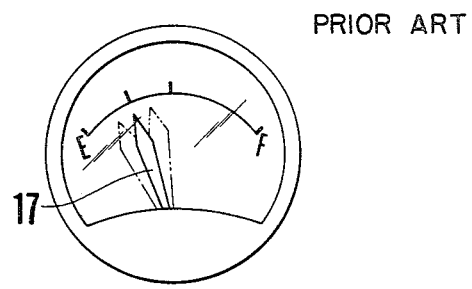
Figure 5:
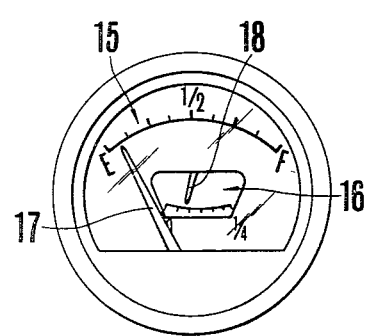
FIG. 5 shows a dial section according to the present invention.

As shown in FIG. 5, the dial section of the fuel gauge system of the present invention is divided into a main dial section 15 and an auxiliary dial section 16. The main dial section 15 indicates the level of fuel by a main pointer 17 according to electric signals transmitted from the main sensor unit A. The auxiliary dial section 16 indicates the level of fuel by an auxiliary pointer 18 according to electric signals transmitted from the auxiliary sensor unit B.

With the construction mentioned above, the fuel gauge system of the present invention can measure and indicate any fuel level between the full-tank level and the empty-tank level through the main sensor unit A, and in particular, when the amount of remaining fuel is small, it can measure and indicate the fuel level through the auxiliary sensor unit B with an accuracy several times as high as that achieved through the main sensor unit A.

Moreover, the auxiliary sensor unit B is little influenced by vibration and tilting of the fuel surface, since it is installed in the small chamber 8 provided at the bottom of the fuel tank 1. The chamber 8 also communicates with the fuel tank 1 through the small hole 7 provided in the wall thereof at its lower side, as mentioned above.

Figure 6:
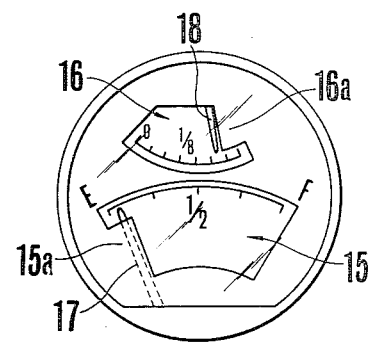
FIG. 6 shows another embodiment of the dial section according to the invention.

FIG. 6 shows a modified form of the dial section of the fuel gauge system according to the present invention. A main pointer-covering section 15a is provided in the vicinity of the "Empty"-indicating portion on the main dial section 15 so that the main pointer 17 may disappear from sight when the amount of remaining fuel decreases to a certain level. In addition, an auxiliary pointer-covering section 16a is provided in the vicinity of the indication-starting position on the auxiliary dial section 16 so that the auxiliary pointer 18 may not come in sight until the amount of the remaining fuel decreases to a certain level. In other words, this modification is so constructed that the auxiliary pointer 18 appears in sight from the inside of the covering section 16a when the main pointer 17 disappears into the covering section 15a. Thus, in this modification, there is no possibility of confusing the main pointer 17 with the auxiliary pointer 18.

It will be understood from the foregoing description that the fuel gauge system according to the present invention can improve the accuracy of its indication on the dial section at the time when the fuel in the tank is running short, and thereby can correctly measure and indicate the amount of the remaining fuel.

While specific embodiments of the invention have been shown and described in detail to illustrate the application of the principles of the invention, it will be understood that the invention may be embodied otherwise without departing from such principles.

What is claimed is:

1. An automobile fuel gauge system comprising: a main sensor unit for a main indicating system in a fuel tank; an auxiliary chamber fixedly provided at the bottom of the fuel tank and having a hole at its lower side to provide a fuel passage from said tank into said auxiliary chamber, an auxiliary sensor unit and an auxiliary indicating system being provided in said chamber, and dial means comprising a main dial section connected to said main sensor unit to indicate the amount of fuel in said tank and an auxiliary dial section connected to said auxiliary sensor unit to provide electric signals to said auxiliary indicating system to indicate the amount of fuel in said tank only when the level of fuel in said tank is below the level of fuel necessary to drive said auxiliary sensor unit to its maximum fuel position.

2. An automobile fuel gauge system comprising a main sensor unit for a main indicating system being provided in a fuel tank, an auxiliary chamber fixedly provided at the bottom of the fuel tank and having at its lower side a hole for fuel passage, an auxiliary sensor unit for an auxiliary indicating system being provided in said chamber, and a main dial section and an auxiliary dial section for performing indications according to electric signals transmitted from said main and auxiliary sensor units, respectively, said auxiliary sensor unit being adapted to operate only when fuel in the fuel tank is running short and being connected by connecting means vertically extending from the top of the fuel tank to the inside of said auxiliary chamber, the height of said chamber being between approximately ¼ and 1/5 of the highest possible level of fuel in the fuel tank, and the width and length of said chamber being not substantially greater than twice the height of said chamber so that said chamber may accommodate said auxiliary sensor unit, and a float of said auxiliary sensor unit may move up and down therein.

3. An automobile fuel gauge system to indicate the amount of fuel in a fuel tank, said system comprising: a main sensor unit in said tank; a main indicating system connected to said main sensor unit to be actuated by signals therefrom and comprising a main dial section, a main pointer, and means covering said main pointer when said pointer reaches a predetermined fuel-indicating level near "Empty"; an auxiliary chamber fixedly provided at the bottom of said fuel tank and comprising wall means having a hole in the lower portion thereof to permit fuel to pass from the lower portion of said fuel tank into said chaber; an auxiliary sensor unit in said chamber; an auxiliary indicating system connected to said auxiliary sensor unit to be actuated by signals therefrom and comprising an auxiliary dial section, an auxiliary pointer for said dial section, and means covering said auxiliary pointer when said auxiliary chamber is full of fuel, said auxiliary pointer being visible only when said auxiliary chamber is less than full and when said main pointer is hidden by the means covering the same near the "Empty" indication.

* * * * *